April 10, 1934.  E. J. FOSTER  1,954,767
VARIABLE SPEED TRANSMISSION
Filed Jan. 14, 1933   4 Sheets-Sheet 1
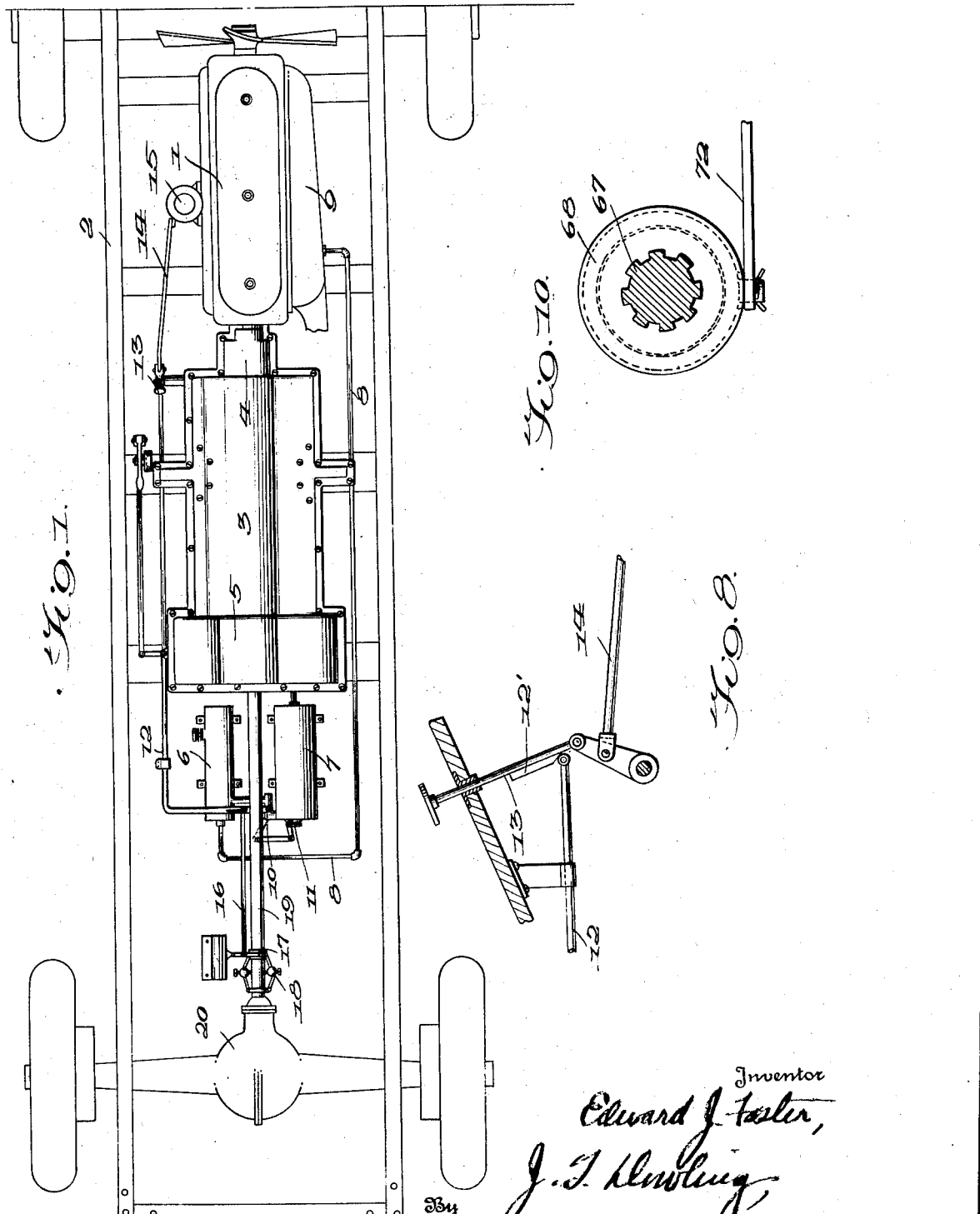

April 10, 1934.  E. J. FOSTER  1,954,767
VARIABLE SPEED TRANSMISSION
Filed Jan. 14, 1933  4 Sheets-Sheet 2
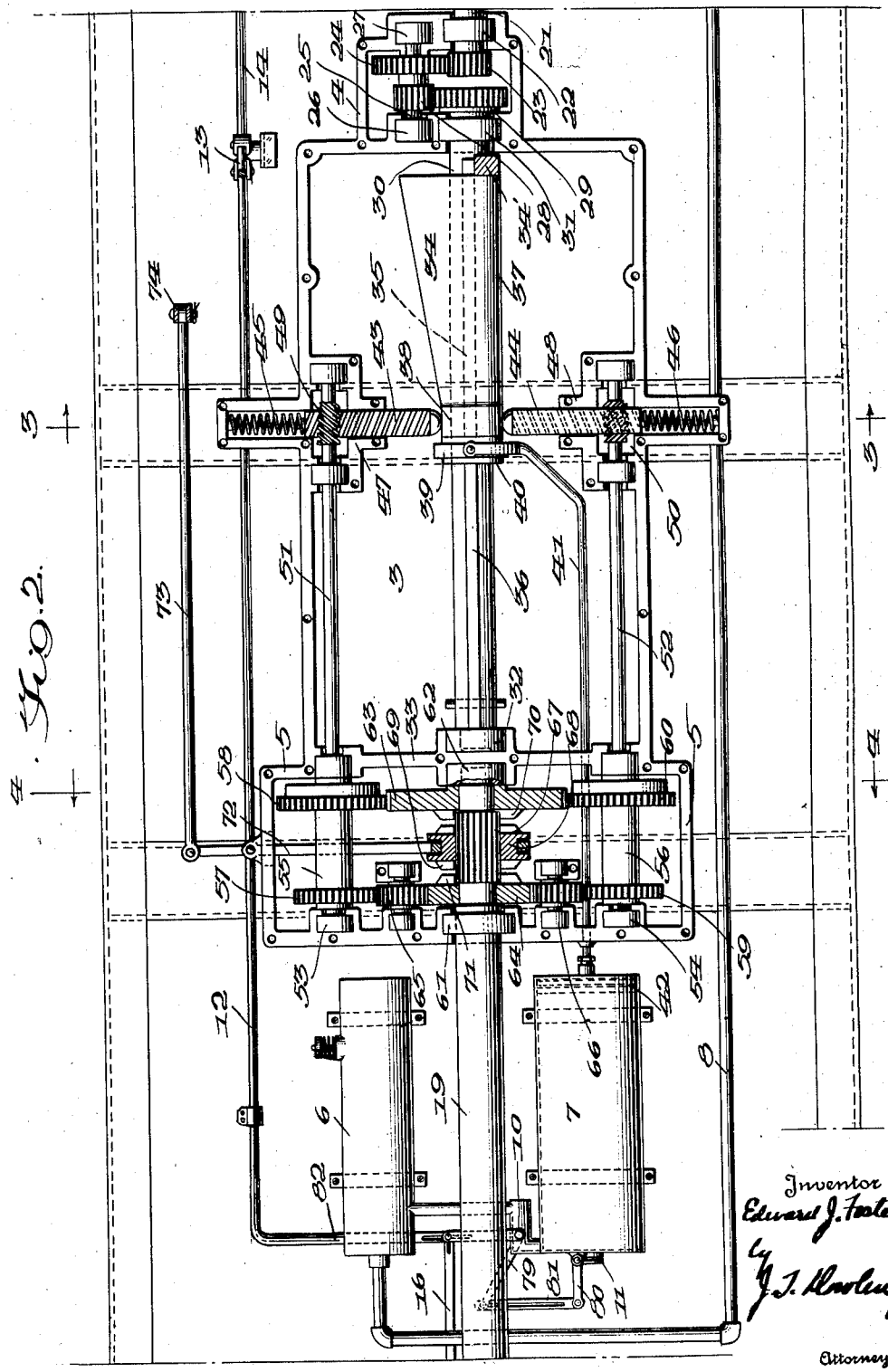

April 10, 1934.  E. J. FOSTER  1,954,767
VARIABLE SPEED TRANSMISSION
Filed Jan. 14, 1933  4 Sheets-Sheet 3
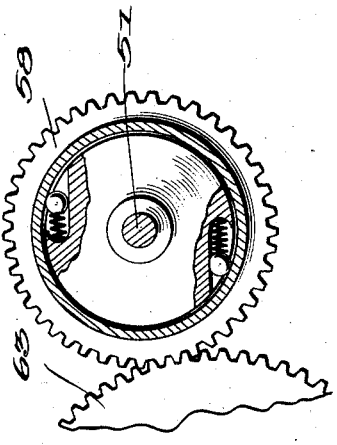
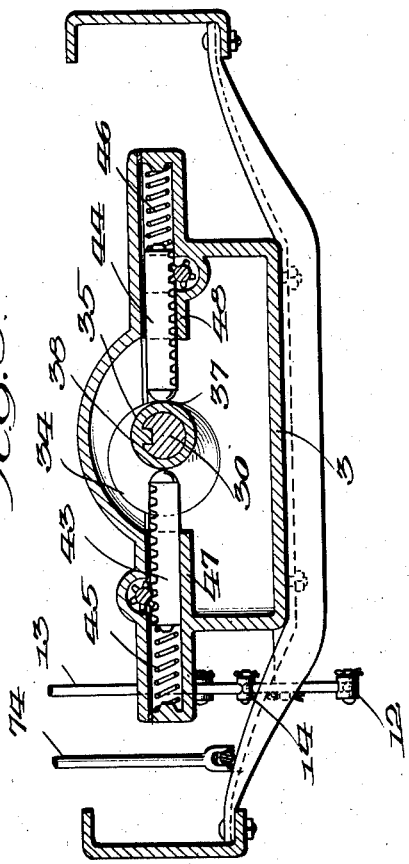
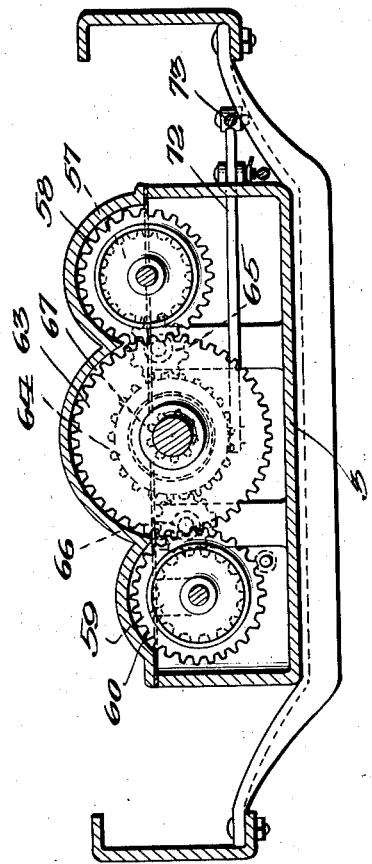
Edward J. Foster, Inventor
By J. T. Dowling, Attorney April 10, 1934.  E. J. FOSTER  1,954,767
VARIABLE SPEED TRANSMISSION
Filed Jan. 14, 1933  4 Sheets-Sheet 4
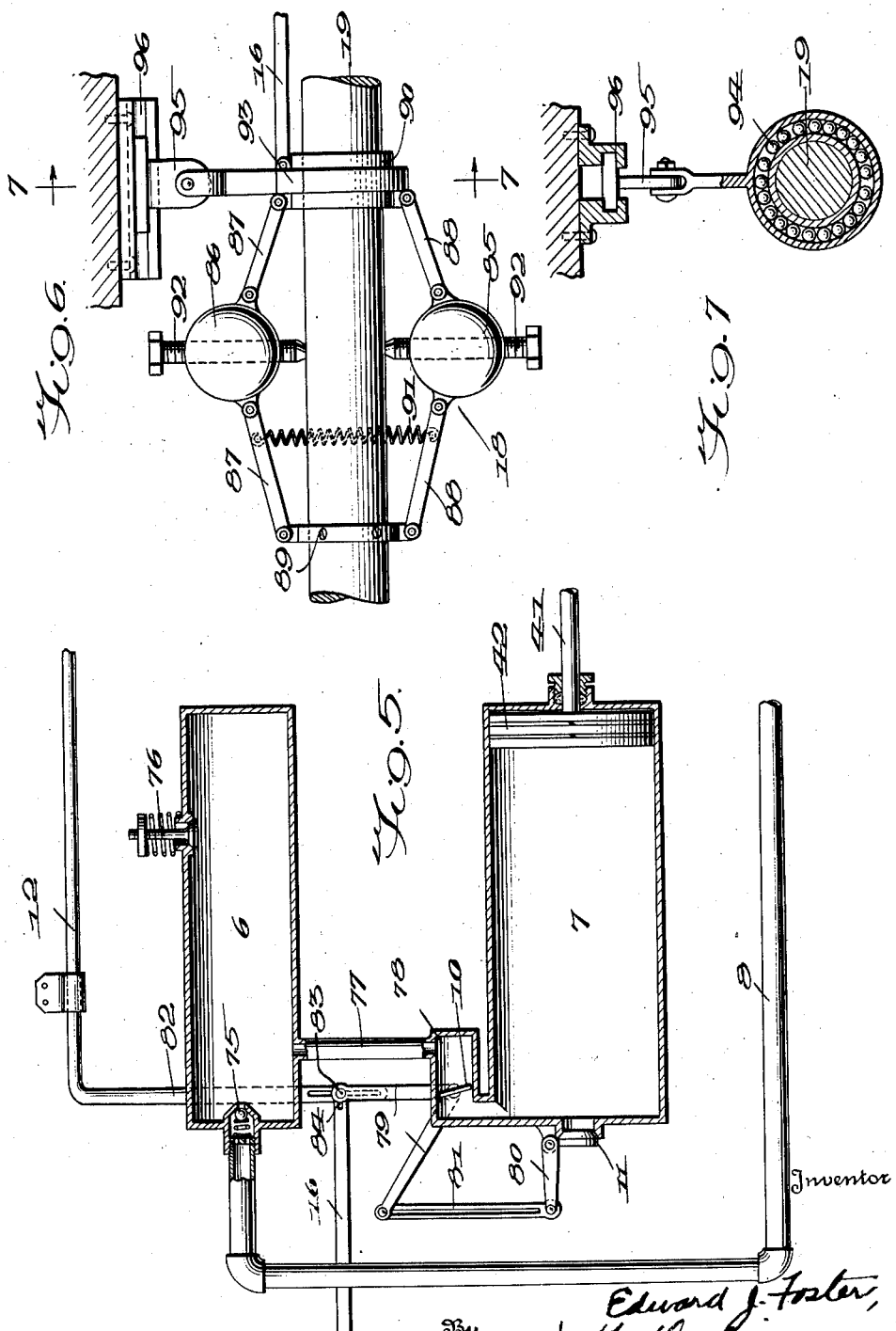

Patented Apr. 10, 1934

1,954,767

UNITED STATES PATENT OFFICE 1,954,767

VARIABLE SPEED TRANSMISSION

Edward J. Foster, Baltimore, Md., assignor of one-fourth to Samuel S. Smalkin, Baltimore, Md.

Application January 14, 1933, Serial No. 651,791

6 Claims. (Cl. 74—107)

This invention relates to a variable speed transmission and although in the present instance the said invention is shown as applied to an automobile transmission it is of course to be understood that it is not to be so limited but is obviously applicable to transmissions generally.

The object of the invention is to provide a variable or change speed transmission controlled automatically by the throttle or accelerator associated with the internal combustion motor or other power plant, in conjunction with a speed governor whereby the usual transmission of the gear shift hand lever type is eliminated as well as the conventional foot clutch.

A further object of the invention and automatic feature thereof resides in a governor control associated with the driven shaft or rear axle, when used in connection with an automobile, whereby the increased speed of the driven mechanism or automobile, will produce an increased driving ratio between the power plant and the driven shaft or rear axle by opening the valve controlling the engine intake manifold suction and closing the venting valve associated with said suction controlling valve, causing the conical cam to move to increased cam throw position.

A further object of the invention is to provide an improved mechanism whereby the road speed of the vehicle or the driven member may be maintained or continued irrespective of the reduced speed of the motor or power plant commonly known in the automobile art as free wheeling.

Another object of the invention is to provide certain instrumentalities whereby the suction or vacuum created by the intake manifold is used as a source of power for operating other instrumentalities to be hereinafter described to produce automatically this change of speed of the vehicle or driven member.

More specifically a further object of the invention is to produce by a variable cam action through certain improved mechanism to be hereinafter more fully described, a change speed driving effect in a gradual, smooth, and positive manner through a direct drive from the engine shaft as distinguished from the conventional change speed gear transmission of the gear shifting type cooperating with a clutch.

A further object of the invention is to provide for a variable reverse speed as well as a variable forward speed.

For the purpose of convenience and description the present invention has been illustrated associated with a motor vehicle and will be so described but as hereinbefore stated it will be perfectly obvious that the transmission is capable of use in any sort of a machine and adapted to be interposed between the power plant and the driven member.

Briefly stated, the invention comprises a driving shaft either directly or by way of reduction gears connected to the power plant with an appropriate housing or casing for supporting the proper bearings of these parts. This drive shaft has slidably mounted thereon, by way of a key and slot or the like, a solid elongated cam of substantially conical shape, one side of said cam being parallel to the axis of the driven shaft and the other side thereof eccentric to said axis with the exception of a small portion thereof at the reduced end of the cam to be hereinafter referred to as the neutral portion thereof. Associated with this cam are a pair of oppositely disposed rack members each in mesh with a worm gear, and said rack members so mounted as to reciprocate, in a manner to be hereinafter described, said reciprocation causing an intermittent forward and reverse rotation of the worm gears. Each of the worm gears is provided with a shaft extending rearwardly and having secured to its rear end a pair of gears, said gears being of the one way or ratchet type so that the forward and reverse rotation of the said shaft will produce a continuous rotation of said gears in the same direction. As hereinbefore stated there are two of these shafts and each shaft is provided with a similar one way gear mechanism as shown in Figure 9, and these shafts together with their gears are disposed on opposite sides of a driven shaft properly mounted in a gear housing. The driven shaft extends into the housing above referred to and is also journalled therein and that portion of the driven shaft within the housing is provided with a pair of gears freely rotatable thereon. Intermediate these gears the shaft is splined to receive a sliding clutch keyed to said splined portion of the shaft. These two gears just referred to are of different size and the inner portions thereof are provided with clutch faces whereby these respective gears will be clutched to the driven shaft upon the shifting of the aforesaid clutch in either direction. The larger of these two gears is in constant mesh with the larger gears carried by the intermittently operated shafts just referred to and the smaller gear on the driven shaft by way of an interposed gear is in constant mesh with the smaller gear on each of the intermittently operated shafts. With this arrangement a forward and reverse speed is provided and this clutch just referred to is always in mesh with the forward speed gear and is only shifted when it is desired to obtain a reverse speed.

The driven shaft extends rearwardly to the axle or other mechanism to be driven, and associated therewith is a speed governor. This governor by certain instrumentalities is adapted to control a pair of valves for the admission and release of the vacuum created in the engine intake manifold and through these instrumentalities and this vacuum created and controlled, the conical cam is caused to reciprocate on the driving shaft to produce a gradual increased speed of the vehicle in a manner to be hereinafter more fully described in detail. Associated with these same instrumentalities connected with the intake manifold, is the usual throttle lever or accelerator so that after the initial starting of the motor, this governor upon operation will control the valve mechanism associated with the engine suction or intake manifold which in turn controls the change speed cam and the speed of the vehicle automatically in a gradual and positive manner.

It is also contemplated when necessary to provide a gear reduction between the power plant and the driving shaft.

Referring to the drawings in detail—

Figure 1 illustrates a top plan view of the various parts as assembled in connection with an automobile;

Figure 2 is an enlarged view partly in plan and partly in section of the complete transmission;

Figure 3 is a sectional view on line 3—3 of Figure 2;

Figure 4 is a sectional view on line 4—4 of Figure 2;

Figure 5 is an enlarged view partly in section of the means or instrumentalities associated with the intake manifold governor and throttle for automatically controlling the change speed mechanism;

Figures 6 and 7 are enlarged detail views of the governor mechanism; and

Figure 8 is a detail view of one preferred form of throttle or accelerator used in connection with the invention;

Figure 9 is an enlarged detail view of the one way or ratchet gears associated with the intermittently operated shafts; and Figure 10 is an enlarged detail view partly in section of the reversing clutch.

Referring to the drawings in detail and with particular reference to Figures 1 and 2 the internal combustion motor or power plant 1 is appropriately mounted in the vehicle frame 2 as illustrated in one embodiment of the invention, and to the rear of the motor and also supported by the vehicle frame 2 is a housing or casing 3 having a reduced forward portion 4 and an enlarged rear portion 5, for the purpose to be hereinafter described. To the rear of the casing 3 are a pair of vacuum tanks 6 and 7. Tank 6 to be hereinafter known as the equalizing or regulating tank, is directly connected by way of a pipe or the like 8 to the intake manifold 9 of the engine. The tank 7, to be hereinafter referred to as the power suction tank has associated therewith the necessary inlet and relief valves 10 and 11 respectively. The inlet valve 10 is connected by proper links and levers to a control rod 12 extending forwardly and in engagement with a wedge like cam 12' carried by the accelerator 13 which accelerator 13 is in turn connected by a rod or the like 14 to the throttle valve of the carburetor 15 in the usual manner.

This inlet valve 10 is also connected by a rod 16 to a sliding collar 17 of a ball governor 18, said governor being mounted on the driven shaft 19, the rear end of said shaft 19 being keyed to the rear axle differential shown generally at 20. The forward end of the driven shaft 19 extends into the casing 3 and said end is connected to the variable speed transmission as shown in detail in Fig. 2.

Referring specifically to Fig. 2, 21 designates the rear end of the motor shaft extending into the reduced part 4 of the casing 3 and the end of the shaft is supported in the casing by an appropriate bearing 22. In the form shown there is provided a reduction gearing for the purpose to be hereinafter more fully described, comprising a gear 23 keyed to the engine shaft 21 meshing with a gear 24 carried by a jack shaft 25 also journalled in the reduced part 4 of the casing by appropriate bearings 26 and 27. This jack shaft carries a second gear 28 adapted to mesh with another gear 29 which latter gear is keyed to a shaft 30, the forward end of said shaft being also journalled in the reduced part 4 of the casing by a bearing or the like 31. This shaft 30 extends rearwardly within the main casing 3 and its rear end is antifrictionally mounted by proper bearings 32 in a cross member 33 carried by the casing 3. Slidably mounted on the shaft 30 is what might be termed a conical cam 34, said cam being provided with a key 35 (see Fig. 3), adapted to engage an elongated slot or key way 36 formed in the shaft 30.

This cam 34 is of eccentric construction, one side thereof 37 being parallel to the shaft 30, whereas the opposite side of the cam is of gradual increasing eccentricity or offset construction with respect to the axis of the shaft 30. The smaller end of the cam 34 is provided with a reduced cylindrical portion 38 to be hereinafter referred to as the neutral end of position of the cam. This reduced end is also provided with a collar or the like 39 antifrictionally mounted thereon and retained in position by a flange or the like 40. This collar 39 is provided with a control rod 41 extending rearwardly into the power suction chamber 7 and that portion of the rod 41 extending within the cylinder 7 is provided with a piston 42 having a working fit within said cylinder 7, whereby in the event of any suction created in the cylinder 7 by the opening of the valve 10, the piston will be pulled rearwardly and thereby operating the cam 34, drawing said cam rearwardly along the shaft 30 during the operation of the mechanism, in a manner to be hereinafter more fully described in detail.

To compensate for the offset portion of the conical cam and the increased weight thrown to one side thereof by reason of the offset portion, this conical cam 34 is provided with a counterbalance weighted portion 34' in order to insure a proper balance of the entire cam and prevent undesirable vibrations upon the rotation of said cam.

At this point it might be well to mention also that the reduction gearing shown at the right-hand of Fig. 2 is for the purpose of preventing a too rapid rotation of the cam relative to the engine speed, in order to further eliminate undesirable vibration. Of course, insofar as the actual operation of the device is concerned, the shaft 30, supporting and rotating the cam member 34 can be directly connected to the motor but in that event the cam would be rotated at the same speed of the motor shaft and for that reason, and as hereinbefore stated, to reduce vibration it is preferred to interpose the reduction gearing as shown.

Diametrically opposite the neutral or cylindrical portion 38 of the cam 34 when said cam is in its neutral or inoperative position are two rack members 43 and 44, said members being urged towards the cam by springs or the like 45 and 46 respectively. These rack bars are adapted to be mounted and supported in guideways 47 and 48 respectively carried by the casing 3 as more clearly shown in Figure 3. These rack bars 43 and 45 are in mesh with worm gears 49 and 50 respectively, said gears being provided with rearwardly extending shafts 51 and 52. The forward ends of the shafts adjacent the worm gears 49 and 50 are antifrictionally mounted within the casing 3 as clearly shown in Figure 2. Likewise the rear ends of the shafts 51 and 52 are journalled in the cross member 33 of the casing 3 also clearly shown in Figure 2. These shafts 51 and 52 extend beyond the cross member 33 into the enlarged portion 5 of the casing and the extreme ends of these shafts are antifrictionally mounted as at 53 and 54 in the rear end of the casing 3.

Those portions of the shafts 51 and 52 within the enlarged portion 5 of the casing 3 are provided with sleeves or the like 55 and 56 respectively, the sleeve 55 including a small gear 57 and a large gear 58 and similarly the sleeve 56 is provided with a small gear 59 and a large gear 60, as shown in Figure 2. These gears, including the sleeves, are of the one way or ratchet type as shown in detail in Figure 9, whereby a continuous forward and reverse rotation of the shafts 51 and 52 will produce a continuous rotation of the sleeves 55 and 56 and their gears, in one direction for the purpose and objects to be hereinafter described.

As hereinbefore stated the driven shaft 19 extends into the casing 3 and is journalled therein by way of bearings 61 and 62 and that portion of the driven shaft 19 within the enlarged part 5 of the casing 3 is provided with a large gear 63 and a small gear 64 both freely rotatable on said shaft. The gear 63 is constantly in mesh with the ratchet gears 58 and 60 and the smaller gear 64, through intermediate gears 65 and 66 is constantly in mesh with the small gears 57 and 59 carried by the sleeves 55 and 56 respectively.

That portion of the driven shaft 19 disposed between the gears 63 and 64 is splined as at 67 and slidably mounted on the splined portion of the shaft 19 is a clutch member 68, said clutch member being provided with clutch faces 69 adapted to engage clutch faces 70 and 71 carried by the inner faces of the gears 63 and 64 respectively, whereby upon the sliding of the clutch 68 in either direction, the corresponding gear 63 or 64 will be clutched to the driven shaft 19. The clutch 68 is provided with a lever 72 connected to a link 73 extending forwardly to an operating member 74. This clutch is for the purpose of providing a reverse for the transmission. Normally the clutch 68 is in engagement with the gear 63 to produce the forward drive and said clutch is only shifted to the gear 64 when it is desired to reverse the direction of movement of the driven shaft or to reverse the direction of travel of the vehicle.

As hereinbefore stated the suction control valve 10 and release valve 11 are controlled by the ball governor 18 through the linkage 16, the accelerator pedal being provided to initiate starting of the motor and to increase the speed of the motor as desired, whereas the governor controls the action of the cam 34 through the suction apparatus to gradually increase the speed of the vehicle or of the driven shaft relative to the speed of the motor or power plant. The ball governor 18 is also adapted to automatically function to break the vacuum by closing the valve 10 and opening the valve 11 to permit the cam 34 to resume its neutral position, upon the slowing down of the vehicle when the brakes or the like are applied.

The detail construction and arrangement of these various links and levers, valves, regulating and power suction cylinders are shown in detail in Figure 5. Upon referring to Figure 5 it will be noted that the suction line or pipe 8 running to the intake manifold is connected to the regulating or equalizing tank 6 by a ball check valve 75 and the suction or vacuum is regulated by a spring control valve 76. The equalizing or regulating tank 6 is connected to the tank 7 by a pipe or the like 77 through a valve chamber 78 containing the intake valve 10. This valve 10 is provided with a bell crank lever 79 having one leg connected to an arm 80 of the relief valve 11 by way of a slotted link 81 and the other leg of the bell crank 79 is pivotally connected to the link 12 extending forwardly to the accelerator pedal as hereinbefore referred to. This second arm of the bell crank lever 79 is also connected to the link 16 extending rearwardly to the ball governor 18, by a pivot 83, and at its point of connection the link 16 is provided with a slightly elongated slot 84.

With the construction just described a rearward pull on the link 16 will cause a rearward movement of the bell crank 79 and correspondingly an opening of the valve 10 permitting a suction in the power suction chamber 7, which action will cause a pulling over of the piston 42 and a corresponding movement of the rod 41 and simultaneously therewith producing a rearward sliding motion or movement of the cam 34 for the purpose to be hereinafter more fully described. The slot 84 in the end of the link 16 extending to the ball governor will permit the initial starting of the motor and the speeding up thereof to a certain extent sufficient to start the vehicle moving without in any way affecting the link 16 or its ball governor 18. As the speed of the vehicle increases, the action of the ball governor will cause a rearward movement of the link 16, a rearward movement of the bell crank 79 and a further opening of the valve 10, which in turn increases the suction in the tank 7 and increases the pull on the piston 42 and rod 41 and causes a rearward movement of the cam 34, thus increasing the driving ratio. It is of course to be understood that during the opening of the valve 10 according to the increased pull on the link 16 and increased speed of the vehicle, the relief valve 11 should remain closed and for that reason the link 81 connecting the bell crank 79 with the arm 80 of the valve 11 is slotted so that upon the opening of the valve 10 and a downward movement of the rear leg of the bell crank 79, the arm 80 will not be operated or caused to function, whereas when the valve 10 reaches its extreme closed position, the rear leg of the bell crank 79 will have arrived at the extreme upper end of the slot formed in the link 81 in a manner sufficient to cause an opening of the relief valve 11 so that a bleeding of the power suction cylinder 7 will be accomplished and permit the piston 42 to move forwardly in the position as shown in Figure 5, whereupon the cam 34 will be in its neutral position.

As hereinbefore stated, when it is desired to slow down the vehicle or the driven shaft and pressure is relieved from the accelerator pedal, the ball governor will also function as the speed of the vehicle decreases upon the application of the brakes or the like, causing a forward movement of the link 16 and thereby producing a closing of the valve 10 to the suction and opening the relief valve 11 to bleed the cylinder 7 and permit the cam 34 to resume its neutral position.

The position of the various parts as shown in Fig. 5 is that point in the operation just prior to the complete closing of the valve 10 and the beginning of the opening of the valve 11 and the link 16 extending from the governor is just about beginning to move forwardly to complete the closing of the valve 10 and cause an opening of the relief valve 11.

In the preferred form of governor as illustrated in Figures 6 and 7 the balls 85 and 86 are supported by links 87 and 88 respectively, said links in turn being secured to the driven shaft 19 by a collar 89 rigidly secured thereto and a collar 90 slidably mounted on said shaft. The control rod or link 16 previously referred to is secured to the sliding collar 90 so that said link or rod 16 will be simultaneously moved with the collar as the balls 85 and 86 are extended and contracted during the rotation of the shaft 19. In order to return the balls to their retracted position and to prevent a too rapid outward throw of the balls 85 and 86, there is provided a spring or the like 91, and to regulate the action of the governor each ball is provided with a thumb screw or the like 92. As hereinbefore stated, the rod or link 16 is controlled by the sliding collar 90 but in view of the fact that this collar rotates with the shaft, the link 16 is not directly connected thereto but is secured to a yoke or the like 93 carried by the collar 90, and interposed between the yoke 93 and said collar is a ball bearing or the like 94 as more clearly shown in Figure 7, the collar 90 being provided with an annular groove to receive the yoke 93 and its bearing 94. This yoke is supported by a bracket or the like 95 slidably supported from a stationary part of the frame of the machine by a guideway or the like 96, by which arrangement the sleeve is permitted to slide on the shaft carrying with it the yoke without permitting the yoke to rotate, so that the rod or link 16 may be connected to this yoke rather than directly to the sliding sleeve 90.

In Figure 9 is illustrated a preferred form of one way or ratchet gear to be used in connection with the assembly and corresponds to gears 58 and 60 more clearly shown in Figure 2. These one way gears are of the ball clutch type.

The operation of the variable speed transmission as herein described is as follows.

Referring to Figures 1 and 2 the motor power plant is started in the usual manner, and if necessary a separate hand throttle may be provided in order to properly warm up the motor before bringing the transmission into operation and throwing a load thereon. Assuming that the motor is sufficiently warm to develop its power under load, a forcing down of the foot accelerator 13 will speed up the motor will cause wedge like cam 12' to force back the rod 12 and cause a preliminary opening of the valve 10 of the power suction chamber 7, whereupon a vacuum will be created in said chamber as this chamber is in communication through valve 10 with the intake manifold of the motor. As the valve 10 is gradually opened by reason of the link 12, and bell crank 79, and as the suction increases, the piston 42 within the chamber 7 will be drawn rearwardly. Up to this time the conical cam 34 has remained in its neutral position as shown in Figure 2 and although the driving shaft 30 is being rotated through the reduction gearing or direct, no driving force is transmitted through the driven shaft for the reason that the rack bars 43 and 44 are in engagement with the cylindrical or neutral portion 38 of the cam 34. As the piston 42 of the suction chamber 7 is drawn rearwardly, the cam 34 is correspondingly drawn rearwardly by reason of the rod connection 41, and as said cam continues to move rearwardly, the offset portion of the cam will begin to engage intermittently the respective rack bars 43 and 44, causing a reciprocation of said bars and a corresponding forward and reverse rotation of the shafts 51 and 52, the springs 45 and 46 of the rack bars maintaining said rack bars in constant engagement with the rotating conical cam and by reason of the particular shape of the cam, these rack bars will be caused to move in and out, thereby producing an alternating forward and reverse rotation of the shafts 51 and 52.

This rotation of the shafts 51 and 52 is transmitted to the one way gears 58 and 60, which gears in turn transmit a continuous rotation in one direction, to the gear 63 which is at that time keyed to the driven shaft 19 by way of the clutch 68, whereby the driven shaft 19 is caused to rotate continuously in the same direction, transmitting this power to the rear axle of the car. As the car begins to move and gains headway, the governor will begin to function and through its connecting link 16, the valve 10 of the suction power chamber 7 will be caused to open more and more until the maximum speed has been reached relative to the engine speed at that time, and the conical cam 34 has been pulled rearwardly to its extreme position for that speed and the rack bars 43 and 44 are receiving the effect of the throw of the cam at that point. A further speeding up of the motor will produce an additional speeding up of the car and the ball governor will again begin to function to gradually and automatically further increase the speed of the car in the manner just described.

When it is desired to disconnect the power from the vehicle transmission it is only necessary to release the accelerator or throttle, whereupon by reason of the one way gears 58 and 60 the continued rotation of the driven shaft 19 by the rear wheels of the car travel over the ground, will automatically disconnect shaft 19 from the driving mechanism through the instrumentality of the one way or ratchet gears 58 and 60.

Should it be desired to slow up or stop the vehicle upon the application of the brakes, the rear wheels together with the driven shaft 19 will be slowed down and this will affect the governor, permitting a contracting thereof causing a forward movement of the link or rod 16, which in turn will cause a closing of the valve 10 (see Fig. 5) and upon the complete closing of the valve 10 cause an opening of valve 11, a breaking of the vacuum in the vacuum power chamber 7, permitting the piston 42 to move forwardly to the position as shown in Figure 5, and the conical cam 34 to also move forwardly until the same arrives at its neutral position as shown in Figure 2, whereupon the transmission will be in effect disconnected from the power plant corresponding to the idling position of the motor and transmission.

Although the invention has been illustrated and described in connection with a motor vehicle, it will of course be understood that this novel transmission is applicable to all forms of power plants involving a driving and driven shaft.

What is claimed is:

1. In a transmission, the combination with a driving member including an engine therefor, and a driven member, of a change-speed mechanism, means under the control of the engine throttle for initially starting said mechanism and means for automatically controlling thereafter said change-speed mechanism to vary the speed of the driven member when in driving connection with the change-speed mechanism, and automatic means for disconnecting the driven member from said change-speed mechanism.

2. In a transmission, the combination with a driving member and a driven member, of a change-speed mechanism, means for automatically controlling said change-speed mechanism, automatic means for disconnecting the driven member from the change-speed mechanism, and automatic means for causing said change-speed mechanism to resume its neutral or inoperative position after being so disconnected.

3. In a transmission, the combination with a driving member and a driven member, of a change-speed mechanism, means for automatically controlling said change-speed mechanism, automatic means for disconnecting the driven member from said change-speed mechanism, and a governor under the control of the driven member for causing the change-speed mechanism to resume its neutral or inoperative position after being so disconnected.

4. In a transmission, the combination with driving and driven members, of a change-speed mechanism connected to and interposed between said members, a variable cam drive forming a part of the change-speed mechanism, an engine including the usual intake manifold and throttle, means under the control of the intake manifold suction for operating said cam and means controlled by the engine throttle for initially regulating said suction.

5. In a transmission, the combination with driving and driven members, of a change-speed mechanism connected to and interposed between said members, a variable cam drive forming a part of the change-speed mechanism, an engine including the usual intake manifold and throttle, means under the control of the intake manifold suction for operating said cam, means controlled by the engine throttle for initially regulating said suction, and means for automatically releasing said suction.

6. In a transmission, the combination with driving and driven members, of a change-speed mechanism connected to and interposed between said members, a variable cam drive forming a part of the change-speed mechanism, an engine including the usual intake manifold and throttle, means under the control of the intake manifold suction for operating said cam, means controlled by the engine throttle for initially regulating said suction, means for automatically regulating thereafter said suction for increasing the speed of the driven member, and means for automatically disconnecting the driving and driven members from the change-speed mechanism.

EDWARD J. FOSTER.